C. COLLIN.
TYPE SETTING AND DISTRIBUTING MACHINE.
APPLICATION FILED APR. 1, 1912.
1,078,832.
Patented Nov. 18, 1913.
5 SHEETS—SHEET 2.
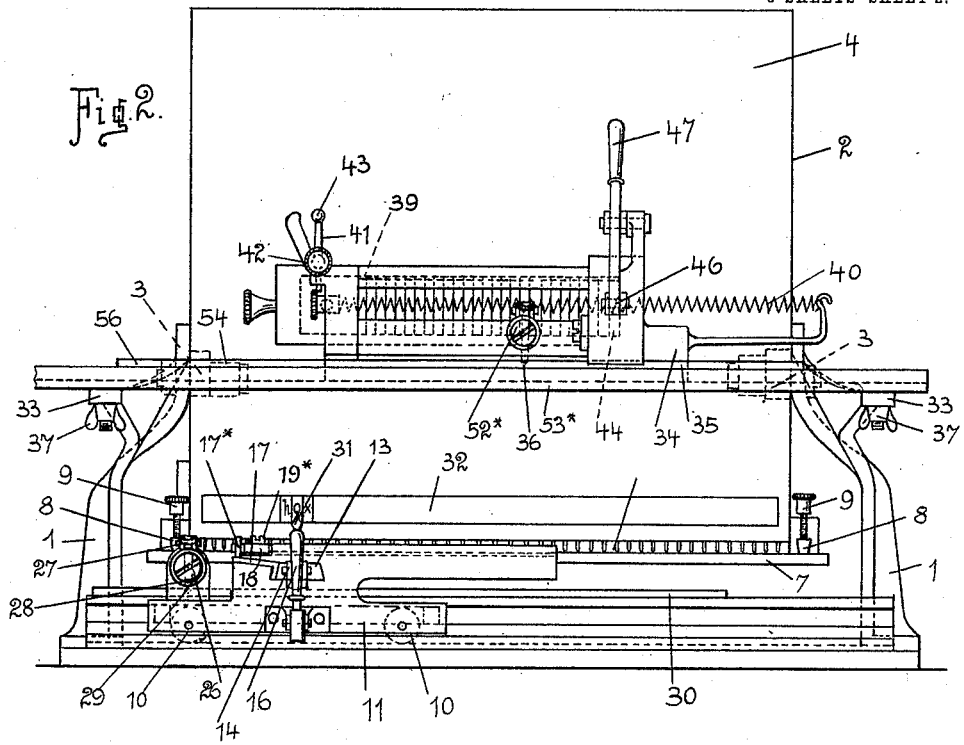
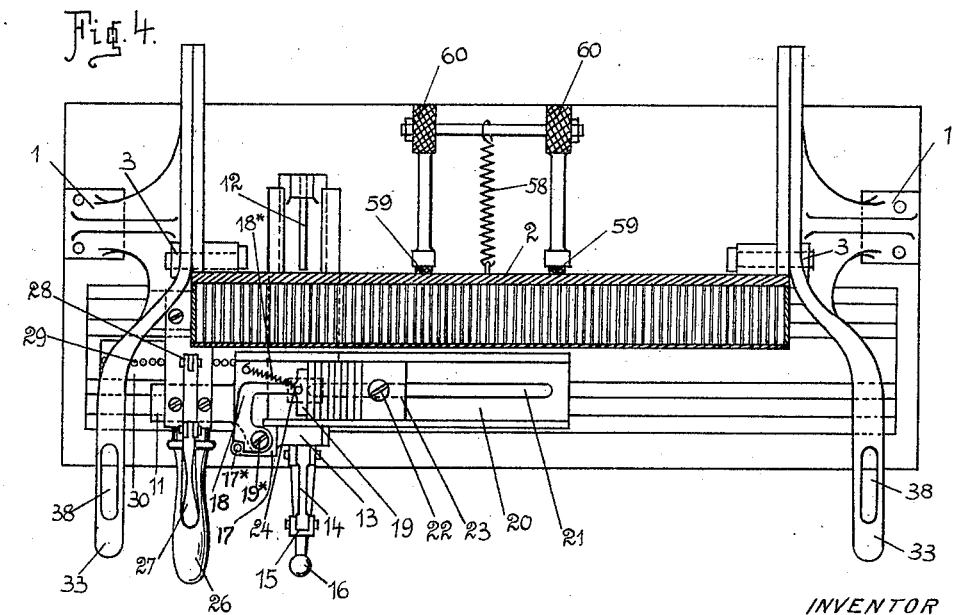
WITNESSES:
George Du Bon
Louis Alexander
INVENTOR
Carl Collin
BY
ATTORNEYS

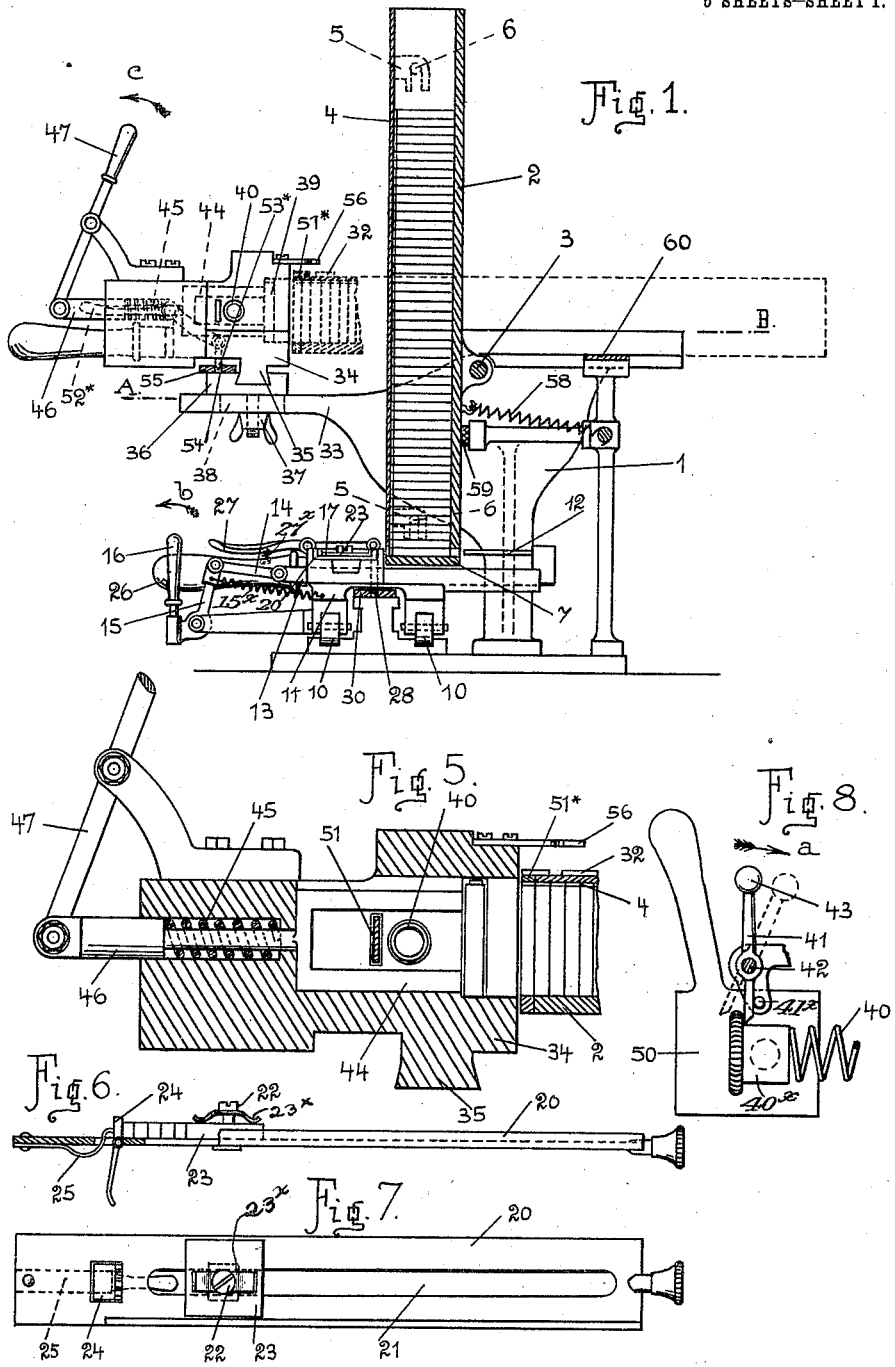

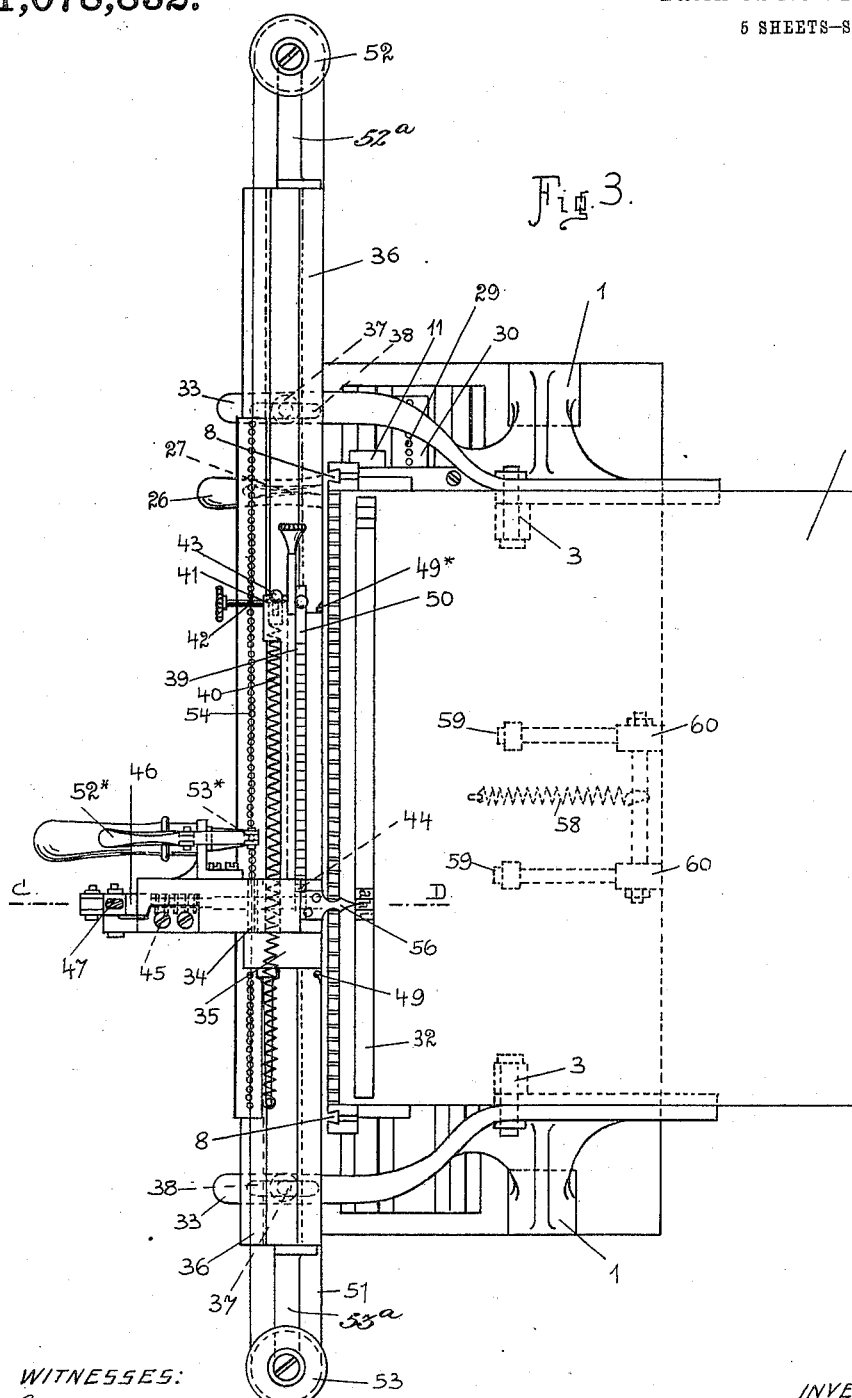

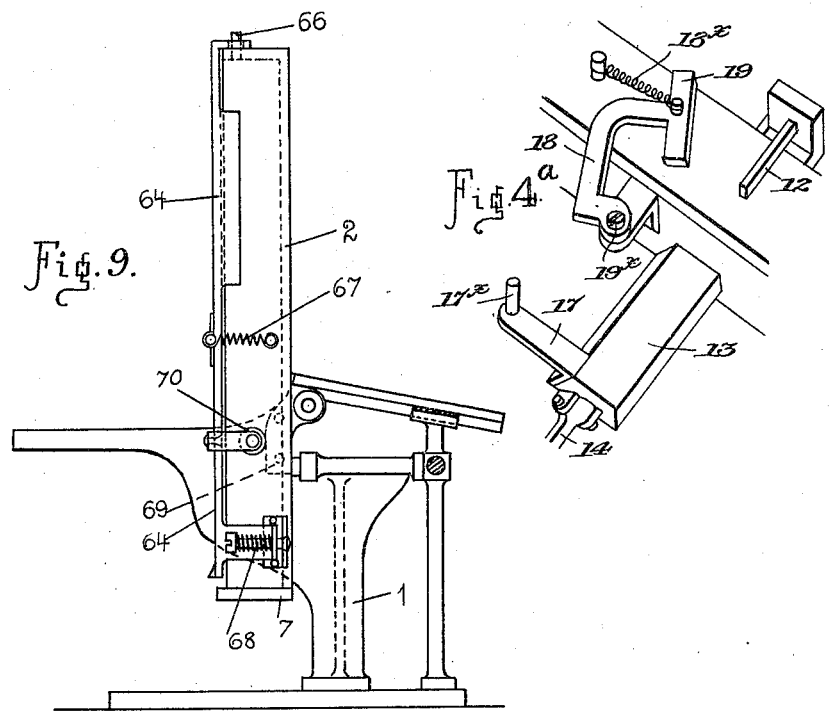
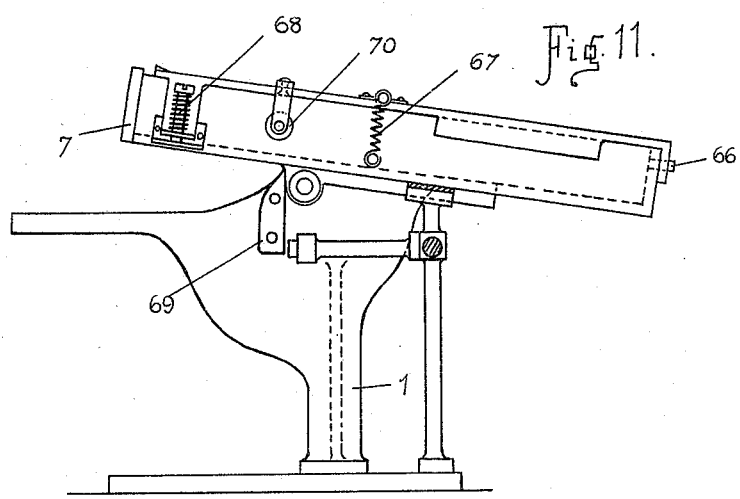

C. COLLIN.
TYPE SETTING AND DISTRIBUTING MACHINE.
APPLICATION FILED APR. 1, 1912.
1,078,832.
Patented Nov. 18, 1913.
5 SHEETS—SHEET 5.
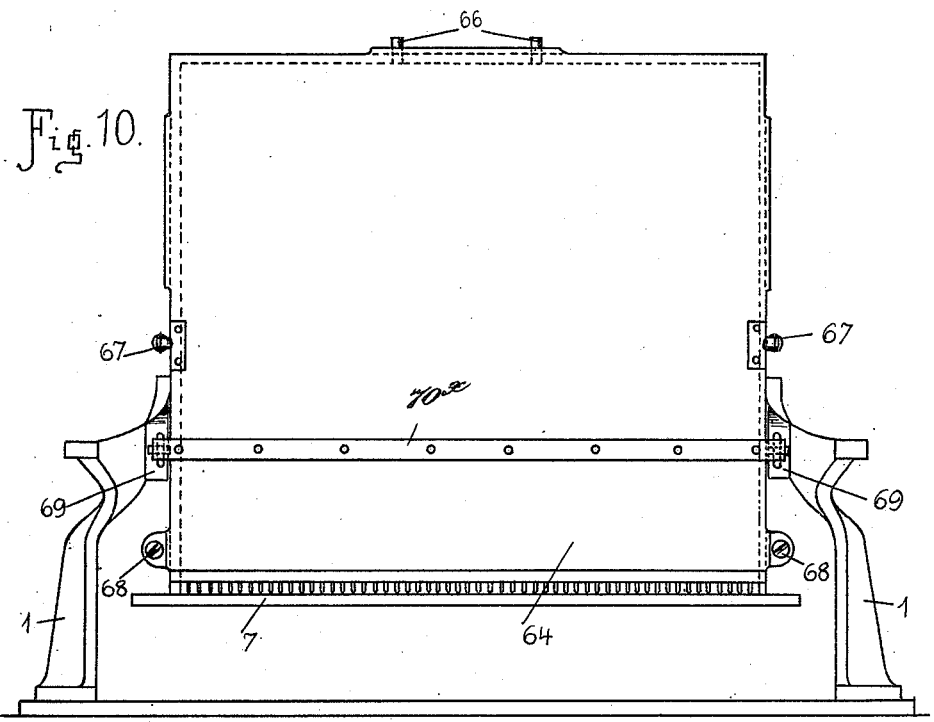
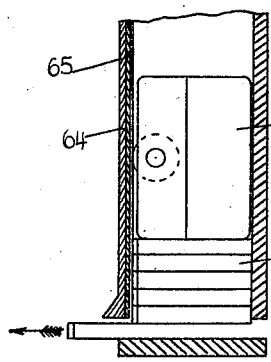
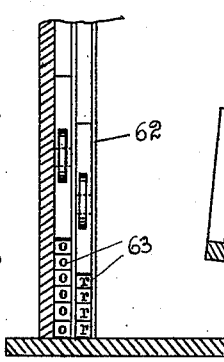
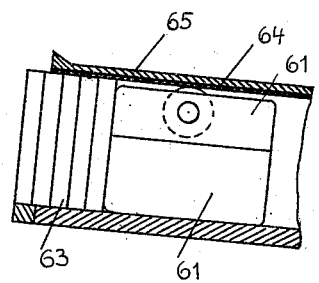
WITNESSES:
George Du Bon
Louis Alexander
INVENTOR
Carl Collin
BY
Poresen Hinanti
ATTORNEYS

UNITED STATES PATENT OFFICE.

CARL COLLIN, OF OFFENBACH-ON-THE-MAIN, GERMANY.

TYPE SETTING AND DISTRIBUTING MACHINE.

1,078,832.  Specification of Letters Patent.  Patented Nov. 18, 1913.

Application filed April 1, 1912. Serial No. 687,814.

*To all whom it may concern:*

Be it known that I, CARL COLLIN, manufacturer, a subject of the German Emperor, and resident of Offenbach-on-the-Main, Germany, have invented new and useful Improvements in or Relating to Type Setting and Distributing Machines, of which the following is a specification.

This invention relates to a device for setting and distributing type of the kind in which separate carriages are employed for the setting and for the distribution of the types.

According to this invention the type magazine is so arranged as to be capable of being set in both working positions, that is to say, when composing, in a vertical position with respect to the setting carriage, and, when distributing in a horizontal position, or a position slightly inclined from the horizontal, with respect to the distributing carriage.

The invention further relates to a particular form of construction which may be employed in carrying this arrangement into effect, and also to various details of the type magazine and its elements.

The invention is illustrated in the accompanying drawings in which—

Figure 1 is a side-view of a machine with the type-magazine in section; Fig. 2 is a front view with the type magazine in the vertical position. Fig. 3 is a plan with the type magazine in the horizontal position. Fig. 4 is a section on the line A—B of Fig. 1. Fig. 4ª shows in perspective some details of the type setting carriage. Fig. 5 is a section on the line C—D of Fig. 3. Figs. 6 and 7 show a detail of the composing carriage and Fig. 8 a detail of the distributing carriage. Figs. 9 and 10 illustrate a particular construction of the type-magazine in side and front view respectively, the type-magazine being in the vertical position. Fig. 11 is a view corresponding to Fig. 9 with the magazine in a position somewhat inclined to the horizontal and Figs. 12, 13 and 14 are detail views in section, and to a large scale, of the type magazine shown in Figs. 9, 10 and 11.

Referring to Figs. 1 to 8 of the drawings the type magazine 2 is mounted in the frame 1 of the machine so as to be capable of rotation about pins or pivots 3. The removable cover 4 is secured by slotted lugs 5 which engage pins 6 while the bottom plate 7 of the magazine is provided with dove-tail pieces 8 (Fig. 2) which fit in corresponding dove-tail bearing pieces, an arrangement which permits of easy removal. Set-screws 9 are provided to make the dove-tail connection perfectly secure. The device for setting the type comprises a reciprocatory carriage 11 (Figs. 1, 2 and 4) mounted upon rollers 10 and located below the type magazine. The pricker 12 can be moved to push out the type, by a rod 13, which is mounted in the carriage so as to be capable of transverse reciprocation, a connecting rod 14, a bell-crank lever 15 and a handle 16 and is returned to its normal position by a suitable spring $15^\times$ (Fig. 1). The rod or slide 13 carries a laterally projecting bracket 17 provided with a stop $17^\times$ which, when the pricker is in its normal position of rest as indicated in Fig. 4, prevents movement of a bell-crank lever 18 capable of rotation about a pin $19^\times$ under the influence of a tension spring $18^\times$ said lever being provided with a foot 19 which normally rests against the ejected type. The relations of these parts are more clearly shown in Fig. 4ª where the slide 13 together with the stop pin $17^\times$ are shown in their forward position. It will be seen that $17^\times$ has been withdrawn from the heel of the lever 18 and the latter under the influence of the spring $18^\times$ has been moved toward the left, thereby carrying the foot 19 away from the line of type. When the slide 13 returns to normal position the stop pin $17^\times$ will strike the heel of the lever 18 and restore it to the position indicated in Fig. 4 and the foot 19 striking the type last ejected will move the entire type line over an amount equal to the width of the ejected type.

The removable composing galley 20, which rests upon the carriage 11, is provided with a longitudinal slot 21 in which moves the pin 22 of a slide 23 which forms a stop for the ejected type and which is prevented from being unintentionally moved, for example by its own weight, or by a suitable leaf spring $23^\times$. A stop 24 (Fig. 6) is pivotally mounted in the composing galley and is subjected to the influence of a leaf spring 25 in such a manner that it always tends to remain in an upright position. The stop 24, during the act of setting, is however held back in an inoperative position by the under face of the foot 19 on the bell-crank lever 18, the foot 19 being adapted to move over the stop 24 in the plane of the types.

The carriage 11 is moved by a handle 26 and is held in any desired adjusted position by a lever 27, on one arm of which, a pin 28 (Fig. 1) is provided so as to be capable of entering, according to the position of the carriage, one of a series of holes 29 arranged in a rigid plate 30. The lever 27 is subjected to the influence of a spring $27^x$ in such a manner that the pin 28 is normally forced downward so as to be always located in one of the holes 29.

The carriage 11 is disengaged from the frame of the machine by depressing the lever 27. A pointer 31, sliding along a scale 32 divided into spaces, each having an indicating letter or sign, assists the adjustment of the carriage 11, with respect to the type magazine, by means of the lever 27 so that the desired type will be ejected.

The distributing device rests upon brackets 33 on the frame of the machine. The distributing carriage 34 is provided with a dove-tail part 35 which slides in the dove-tail guide of a plate 36 which, by means of fly-nuts 37 and slots 38 (Figs. 1 to 4) in the brackets 33, can be adjusted horizontally to and from the type-magazine. In the distributing carriage is located the distributing galley which consists of a channel 39 into which the lines of type to be distributed are inserted (see Fig. 3). Against that end of the line opposite to the end operated by the distributing pricker, there rests, under the influence of a tension spring 40, a stop 50 (Fig. 8) which, upon insertion of the lines, is retracted and which can be held back by a lever 41 capable of rotation about a pin 42 on the distributing carriage and prevented from over-rotation in one direction by a stop pin $41^x$, also on the distributing carriage and projecting into the path of the lever 41. The lower end of the lever 41 is adapted to pass back of the knurled head $40^x$, to which the spring 40 is attached, and thereby hold the stop 50 in the position indicated in Fig. 8. After insertion of the line the lever 41, or a knob 43 attached thereto is moved in the direction of the arrow $a$ to the dotted position shown in Fig. 8 or until the lower end of the lever 41 is disengaged from the knurled head $40^x$ when the stop 50, under the tension of the spring 40, will be brought into contact with the line of type.

The distribution is effected by a pricker 44 (Fig. 5) which is stirrup-shaped and is operated by a handle 47 rotatably mounted on a pin supported by the carriage and by a connecting rod 46 subjected to the pressure of a spring 45. To each end of the distributing carriage 49, 49 (Fig. 3) is connected an end of a band 51 passing around rollers 52, 53 so that the bottom of the type magazine is closed at all points not covered by the carriage. The rollers 52, 53 are revolubly mounted on the respective arms $52^a$, $53^a$ secured to the ends of carriage supporting plate 36, in the dove-tail guide of which the carriage 34 is adapted to reciprocate. A further closure is effected by a plate $51^x$ (Figs. 1 and 3) covered with india-rubber, which, before distribution takes place, is screwed upon the cover of the type magazine at points adjacent to the delivery openings. The plate $51^x$ must however be removed for the purpose of setting. The correct adjustment of the distributing carriage with respect to the type-magazine is effected in the same manner as for setting that is to say by a hand-lever $52^x$, the pin 53 of which, upon release of the lever, enters the corresponding hole of a series 54 of holes in a plate 55 (Fig. 5). A pointer 56 sliding over a scale 32 assists in the correct adjustment of the carriage.

The operation of the machine is as follows: For setting the type, the plate $51^x$ must be removed and the type-magazine arranged in the vertical position (Fig. 1). By means of the hand-lever 27 the composing carriage is adjusted so that the desired type will be ejected. This is effected by turning the hand-lever 16 in the direction of the arrow $b$ (Fig. 1) the stop $17^x$ being thereby simultaneously moved so that the spring $18^x$ draws back the lever 18 and foot 19 and the type can be ejected from the magazine by the pricker 12. The lever 16 is automatically returned under the influence of its spring $15^x$ so that the stop $17^x$ again rests against the lever 18 which by means of the foot 19 pushes the type already upon the galley a distance corresponding to the width of a type so as to make room for the next type to be ejected. This causes a corresponding movement of the slide 23 so that the type on this side are continually supported. When the line is set up the galley 20 is removed from the carriage and a fresh galley inserted for the setting of another line. This procedure is repeated as often as desired. The type-magazine is held in the vertical position necessary for type setting by a spring 58 which draws it against india rubber buffers 59, (Figs. 1, 3 and 4). When a distribution of type is to follow the magazine is rotated about the pins 3 through an angle of 90° until it rests against the india-rubber buffers 60. In this position the magazine is also held by the spring 58 which is so attached that it can carry out this function in both positions of the magazine. Prior to or during the revolution of the magazine the distributing carriage must be moved outward in the slots 38 after loosening the fly-nuts 37. When the magazine has been turned right over the set-screws 9 (Fig. 2) are loosened the bottom plate 7 removed, and the distributing carriage pushed against the bottom of the magazine and secured in this position by tightening the fly-nuts 37. Further the plate 51 is secured in position in order that the last type in each channel of the type-magazine shall be held securely. By accurately adjusting the pointer 56 on the scale 32 by means of the handle 52× the distributing carriage will be brought each time into such a position that precisely that type which is to be next distributed will reach its corresponding channel upon a movement of the hand-lever 47 in the direction of the arrow c shown in Fig. 1. During this operation the last type in the magazine is always held fast by the plate 51× and apart from this is retained either by the carriage or by the band 51. After all the type has been distributed from the galley further type is inserted in the slot 39 and the distribution is repeated in the manner described.

It should be noted that it is of advantage to adjust the type-magazine so that it inclines somewhat downward toward the rear instead of exactly horizontal thereby avoiding the possibility of type falling out of the magazine. Should it be desired to employ the machine again for type setting, the type magazine is rotated back again in the opposite direction and the setting is again effected in the manner described.

In Figs. 11 to 14 a particular form of construction of the type-magazine, and of its cover is illustrated. The object of this form of construction is to insure that the type in the magazine shall be retained properly arranged and resting against each other. To this end small blocks 61 are employed, the form of which is shown in Figs. 12 to 14. These blocks are provided on the narrow side with small rollers 62 partly sunk in slots in the edge of the blocks the object of which will be hereinafter explained.

As may be seen from Figs. 12 to 14 the blocks 61 rest upon the type 63 within the type magazine and, when the magazine is in the vertical position, serve to keep the pile of type closed up, so that when as shown in Fig. 12 a type is pushed out, the whole pile moves down in close order owing to the weight of the block. In order to insure that the blocks 61 may move down freely, the cover 64 of the type magazine is slightly raised, by a suitable arrangement, from the magazine, so that the blocks have sufficient play to permit them to fall freely. The cover is provided with a suitable elastic layer 65 of india-rubber or the like. One suitable arrangement whereby the cover may be slightly raised from the magazine when in the vertical position is as follows: As may be seen from Figs. 9, 10 and 11 the cover is passed over pins 66 and pressed against the type-magazine by springs 67 and 68. On the frame of the machine is provided a cam or inclined plate 69 which coöperates with rollers 70 carried on the downturned ends of a flat strip 70× secured to cover 64; the rollers 70 being so arranged with relation to the cover 64 that the cover will be somewhat raised, as the type magazine is moved into the upright position (Fig. 9), for the purpose of providing free play for the blocks, which, through their rollers 62 bear against the inside of the cover. On the other hand, when the type magazine is moved into a horizontal position, or, as shown in Fig. 11, into a position inclining toward the rear end, the cover 64 can, after the rollers 70 have left the cam 69, bear firmly upon the magazine, owing to the influence of the springs 67 and 68. The blocks 61 in consequence are held fast in the position they happen to occupy, so that they can no longer move freely. The braking effect, is however not so strong but that the blocks can yield and be pushed back as a type is inserted into the magazine, the blocks in this case preventing the type in the magazine from falling over.

Now what I claim and desire to secure by Letters Patent is the following:

1. In a type setting and distributing machine, the combination of a transversely movable carriage for setting type, a transversely movable carriage for distributing type and a movable type magazine having a plurality of type channels in the same plane adapted to be positioned so as to coöperate with either of said carriages as desired.

2. In a type setting and distributing machine, the combination of a carriage transversely movable for setting type, a carriage transversely movable for distributing type and a movable rectangular type magazine pivotally mounted on an axis parallel to the paths of movement of said carriages and adapted to be moved into coöperative relation with either of said carriages.

3. In a type setting and distributing machine, the combination of a carriage for setting type, a carriage for distributing type, a type magazine provided with a plurality of type channels and pivots adapting said magazine to be turned about an axis extending transversely of said channels for bringing said magazine into coöperative relation with either of said carriages.

4. In a type setting and distributing machine, the combination of a carriage for setting type, a carriage for distributing type, a type magazine provided with a plurality of type channels, and pivots adapting said magazine to be turned about an axis extending transversely of said channels, whereby said magazine may be turned so that said channels stand in a vertical position to cooperate with said type setting carriage, or in an approximately horizontal position to coöperate with said distributing carriage.

5. In a type setting and distributing machine, the combination of a transversely movable carriage for setting type, a transversely movable carriage for distributing type, a movable type magazine having a plurality of type channels in the same plane adapted to be positioned so as to coöperate with either of said carriages and means adapted to hold said magazine in either position.

6. In a type setting and distributing machine, the combination of a carriage for setting type, a carriage for distributing type, a movable type magazine adapted to be positioned so as to coöperate with either of said carriages, a removable end plate for said magazine adapted to close the end when the magazine is in position to coöperate with said type setting carriage and to be removed when the magazine is in position to coöperate with said type distributing carriage and means for removably securing said end plate to the magazine.

7. In a type setting and distributing machine the combination of a carriage for setting type, a carriage for distributing type, a movable type magazine adapted to be positioned so as to coöperate with either of said carriages, an end plate for the magazine adapted to be removed when said magazine is in position to coöperate with the distributing carriage and means adapted to retain the type in place in the magazine when said magazine is in position to coöperate with said distributing carriage.

8. In a type setting and distributing machine, the combination of a carriage for setting type, a carriage for distributing type, a movable type magazine adapted to be positioned so as to coöperate with either of said carriages and means for adjusting the type distributing carriage transversely of its line of movement and relatively to said magazine.

9. In a type setting and distributing machine the combination of a transversely movable carriage for setting type, a transversely movable carriage for distributing type, a movable rectangular type magazine provided with a plurality of type channels in the same plane and adapted to be positioned so as to coöperate with either of said carriages, a character indicating scale on said magazine and a pointer carried by each of the carriages and adapted to coöperate with said scale to position the respective carriages when in use.

10. In a typesetting and distributing machine the combination of a transversely movable carriage for setting type, a transversely movable carriage for distributing type, a movable rectangular type magazine provided with a plurality of type channels in the same plane, and adapted to be positioned to coöperate with either of said carriages, means for ejecting type from said channels when said magazine is in coöperative relation with type setting carriage and means for injecting type into said channels when said magazine is in coöperative relation with the distributing carriage.

11. In a type setting and distributing machine the combination of a carriage for setting type, a type magazine provided with a plurality of type channels and adapted to be positioned so as to coöperate with said carriage, a type ejecting finger mounted on a slide on said carriage, a galley on said carriage adapted to receive type as ejected from said magazine a lever pivotally mounted on said carriage and provided with a foot, adapted to contact with the last type ejected and a pin carried by said type ejecting slide for actuating said lever to move the line of ejected type in the galley a distance equal to the width of the last type ejected.

12. In a type setting and distributing machine the combination of a carriage for setting type, a carriage for distributing type provided with a band connected thereto and adapted to lie in the plane of the face of said carriage, a movable type magazine provided with a plurality of type channels, and adapted to be moved into coöperative relation with either of said carriages, a removable end plate for said magazine adapted to be secured thereto when the magazine is in position to coöperate with said type setting carriage and to be removed therefrom when the magazine is in coöperative relation with said type distributing carriage, the face of the type distributing carriage and said band being adapted to close the end of the magazine when said plate is removed.

13. In a type setting and distributing machine the combination of a type magazine provided with a plurality of type channels, follower blocks in said channels, means for distributing type into said channels, means for setting type from said channels, means for frictionally holding said blocks while distributing type and means for releasing said blocks so that they act by gravity while setting type.

14. In a type setting and distributing machine the combination of a type magazine provided with a plurality of type channels, follower blocks in said channels, a movable cover for said magazine provided with a lining of yielding material, means for moving said cover to bring the lining thereof into yielding contact with said blocks to frictionally hold the same while distributing type, and means for releasing said blocks so that they act by gravity while setting type.

15. In a type setting and distributing machine the combination of a carriage for setting type, a carriage for distributing type, a type magazine provided with a plurality of type channels and adapted to be positioned so as to coöperate with either of said carriages, a cover for said magazine movably mounted thereon, means for moving said cover a limited distance away from the magazine when the same is brought into coöperative relation with the type setting carriage and means for moving said cover toward the magazine when the same is brought into coöperative relation with the type distributing carriage.

16. In a type setting and distributing machine the combination of a carriage for setting type, a carriage for distributing type, a type magazine provided with a plurality of type channels and adapted to be positioned so as to coöperate with either of said carriages, type follower blocks in said channels each provided with a friction roller, a cover for said magazine movably mounted and adapted to contact with the friction rollers of said blocks, resilient means for holding the cover in contact with said rollers when said magazine is brought into coöperative relation with the type distributing carriage and means for moving said cover to remove the pressure on said rollers when said magazine is brought into coöperative relation with the type setting carriage.

In testimony, that I claim the foregoing as my invention, I have signed my name in presence of two witnesses, this 20th day of March 1912.

CARL COLLIN.

Witnesses:
JEAN GRUND,
CARL GRUND.

---

Copies of this patent may be obtained for five cents each, by addressing the "Commissioner of Patents, Washington, D. C."